UNITED STATES PATENT OFFICE 2,535,877

PLANT GROWTH REGULANTS

William D. Stewart, Yonkers, N. Y., assignor to The B. F. Goodrich Company, New York, N. Y., a corporation of New York No Drawing. Application September 3, 1947, Serial No. 772,005

10 Claims. (Cl. 71—2.7)

This invention relates to synthetic compositions which produce histogenic and morphogenic changes in living plants, and more specifically pertains to derivatives of propionic acid which are capable of altering the growth characteristics of plants.

The art of controlled modification of plant growth by the application of synthetic growth regulants has aroused considerable interest in recent years. Many materials have been discovered which when applied to plant structure in minute amounts act as growth regulants. For example, chemical compounds have been found which stimulate and initiate root growth, which stimulate the growth of the abscission cells of fruit stems, which at increased dosages retard the growth of the abscission cells of fruit stems, which stimulate stem bud growth, which stimulate seed germination, which promote callus formation, and which function in similar ways as evocators of plant histogenesis and morphogenesis.

Among the known synthetic plant growth regulants are for example, indoleacetic acid, indolebutyric acid, indolepyruvic acid, naphthalene acetic acid, naphthalene butyric acid, phenyl acetic acid, 2,4-dichlorophenoxy acetic acid, naphthalene glycolic acid and others. While these materials have been widely used they have not been completely satisfactory and hence there is a great need in the art of plant propagation for improved growth regulants. The known regulants and growth initiators are less effective than is desired in various aspects of plant propagation, for example, in the rooting of fruit tree cuttings to propagate desirable somatic characteristics of plants which cannot be transferred by the use of seed, in increasing the percentage of rooted cuttings of those plants now normally produced from cuttings instead of seed, in reducing the number of set fruit on heavy bearing fruit trees, to reduce cost of thinning, in producing higher setting of fruit on light setting trees and bushes, in preventing the premature fall of fruit, in producing seedless or near seedless fruits by inducing parthenogenesis.

Moreover, few of the known plant growth regulants can be synthesized on factory production scale so as to be either available in large enough quantities to supply the demand or sufficiently low in price to attract the attention of prospective users. Also, those which are available in sufficient quantity and at a marketable price to make their use economically feasible do not have as sufficiently wide a range of tolerance of application as is desirable, for the difference between the effective concentration and that which causes undesirable injury to the plant is relatively small in many instances. Consequently, the use of many of the regulants that are now available not only requires the attention of a highly skilled technically trained supervisor during application of the materials but also requires the precise measuring of small quantities in the field with precision usually available only in the chemical laboratory. Accordingly, the precision and supervision required to employ successfully the available regulants and to achieve the maximum benefits of their use often prevent large scale field application by the average prospective user.

I have discovered a class of growth regulants which are exceedingly successful in the art of plant propagation for altering the growth characteristics of plants and which are capable of being successfully applied by a person possessing no special skill. These new materials are beta-(thiono-thio) propionic acids (i. e., they possess the thiono-thio group,

in the beta position) and derivatives of these acids which can be converted to the free acid through hydrolysis involving one molecule of water. These materials function as evocators of histogenesis and morphogenesis in diverse manners to alter the growth characteristics of many types of plants.

The preferred compounds of this new class of growth regulants are those beta-(thiono-thio) propionic acids and their derivatives which have the following general formula:

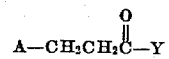

where A is the residue derived from a dithio acid by the removal of the hydrogen atom of the SH group of said acid and where Y is a substituent selected from the group consisting of the hydroxyl radical, an oxy hydrocarbon radical, the amido radical, a hydrocarbon substituted amido radical, and oxy-ammonium and oxy-metallic groups. These propionic acid derivatives, where Y is not OH, are all capable of being converted to the free acid through hydrolysis involving one molecule of water.

The beta-(thiono-thio) propionic acids having the formula set forth above can be readily and conveniently prepared by numerous methods.

For example, beta-chloro or beta-bromo propionic acid may be reacted with an ammonium or a metal salt of a dithio acid to form the beta-(thiono-thio) propionic acid and the ammonium or metal chloride or bromide. The choice of the salt of the dithio acid depends only on the reaction diluent if one is employed. In some instances a soluble salt is desirable, but, in general, one skilled in the art of synthesis would choose the one best suited for his own particular purposes. Since the free dithio acids in general are not stable and their usual stable form is that of the ammonium or metallic salt, the method of preparation outlined above may be readily carried out. Another convenient method of preparation is to react a salt of a dithio acid (for convenience of preparing the reactant usually the ammonium or alkali metal salts are preferred) with beta-propiolactone to form the corresponding salt of a beta-(thiono-thio) propionic acid, for example, ammonium dimethyl dithiocarbamate is reacted with beta-propiolactone to produce ammonium beta-(dimethyldithiocarbamyl) propionate. A more detailed discussion of this method of preparing these beta-(dithiocarbamyl) propionic acids is presented in a copending application Serial No. 620,663, filed October 5, 1945, now Patent No. 2,474,839 issued July 5, 1949.

The beta-(thiono-thio) propionic acids which are useful according to my invention may be further illustrated by the following formulae:

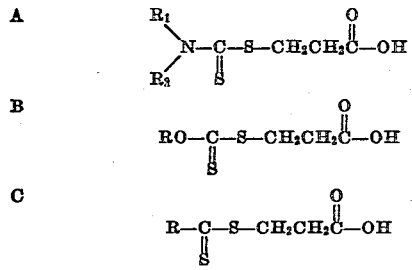

In the above formulae R, $R_1$ and $R_2$ are hydrocarbon groups such as alkyl, alkenyl, aralkyl, alkaryl and alicyclic groups and preferably contain from 1 to 6 carbon atoms.

More specifically the beta-(thiono-thio) propionic acids which are useful are among others such beta-(dithiocarbamyl) propionic acids as beta-(mono- and di-methyldithiocarbamyl) propionic acids, beta-(mono- and di-ethyldithiocarbamyl) propionic acids, beta-(mono-and di-hexyl) propionic acids, beta-(mono- and di-cyclohexyl) propionic acids, beta-(piperidyl dithiocarbonyl) propionic acid, beta-(mono- and di-phenyl dithiocarbamyl) propionic acid, beta-(mono- and di-orthotolyl dithiocarbamyl) propionic acid, beta-(mono- and di-benzyl dithiocarbamyl) propionic acid, beta-(allyl dithiocarbamyl) propionic acid, and the like; such beta-(xanthogenyl-thio) propionic acids as beta-(ethyl xanthogenyl-thio) propionic acid, beta-(propyl xanthogenyl-thio) propionic acid, beta-(isopropyl xanthogenyl-thio) propionic acid, beta-(cyclohexyl xanthogenyl-thio) propionic acid, beta-(benzyl xanthogenyl thio) propionic acid, beta-(allyl xanthogenyl-thio) propionic acid, and the like; and such other beta-(thiono-thio) propionic acids as beta-(methyl thiono-thio) propionic acid, beta-(ethyl thiono-thio) propionic acid, beta-(propyl thiono-thio) propionic acid, beta-(benzyl thiono-thio) propionic acid, beta-(allyl thiono-thio) propionic acid, beta-(phenyl thiono-thio) propionic acid; and the like.

The esters of the above beta-(thiono-thio) propionic acids which are useful are such alkyl esters as the methyl, ethyl, n-propyl, isopropyl, n-butyl, isobutyl, tertiary butyl, amyl, hexyl esters and the like; such aryl esters as the phenyl, naphthyl, tolyl esters, and the like; such aralkyl esters as the benzyl esters, phenethyl esters and the like; such alicyclic esters as the cyclohexyl ester; such unsaturated esters as the allyl, methallyl, 3-methyl-3-hexenyl, 2-methyl-1-butenyl esters, and the like as well as others.

Also other derivatives of the above acids are useful growth regulators. The amides and such substituted amides as for example the mono- and di-metyl amides, mono- and di-ethyl amides, mono- and di-isobutyl amides, mono- and di-cyclohexyl amides, mono- and di-phenyl amides, benzyl amides and phenethyl amides have useful properties. Salts of the above acids also are useful, especially the ammonium, sodium, potassium, magnesium, zinc and iron salts.

The compounds of this invention may be employed in numerous ways to stimulate or modify the growth characteristics of plant structures. For example, they may be applied to seeds to stimulate germination or to stimulate root and stem development; they may be applied to tubers to promote root development and stem bud growth; they may be applied to cuttings and transplants to stimulate root formation, or they may be applied to blossoms to induce parthenogenesis. Also, they may be applied to intact plants to retard blossoming, to stimulate the growth of abscission cells to produce premature dropping of blossoms and set fruit, or by varying the manner of treatment may also modify the growth of abscission cells to prevent drop of mature fruit. Thus, these compounds may be capable of producing a variety of desirous modifications of plant growth which are exceedingly useful and beneficial to the operators of greenhouses, orchards and nurseries.

In the applications of these compounds to produce these growth modifications different compositions may be employed. In general, aqueous dispersions or aqueous solutions depending on whether or not the compound is water-soluble will be found most desirable. The dispersions will of course contain a dispersion or wetting agent and the solutions also preferably contain wetting agents to facilitate the spreading of the solution. Such wetting and dispersing agents as, for example, those typified by the following general classifications: sodium and potassium salts of fatty acids known as soft and hard soaps; salts of disproportionated abietic acid known as rosin soaps; salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurates, palmitate, stearate, and oleate; and others may be advantageously employed in aqueous compositions employing this new class of growth regulators. These dispersing and wetting agents are sold under numerous trade names and may either be pure compounds or be mixtures of compounds of the same general group. The aqueous dispersions and solutions may also contain adhesives or stickers to prevent the removal of the stimuli by weathering. A material which will function as an excellent sticker or adhesive and may be employed with unusual success is the aqueous dispersions of polymeric organic polysulfides which on drying form a discontinuous, translucent, rubbery, microscopic film. An example of this type of sticker is the aqueous dispersions of polymeric ethylene polysulfide prepared in the presence of a salt-stable emulsifying agent.

The compounds may also be applied in admixture with other diluents either as pastes or dusts. The pastes may be prepared with any inert vehicle while the dusts are usually prepared with some finely-divided inert material such as talc, flour, fuller's earth, clay or other pulverulent materials, soluble or insoluble in water.

In all their various applications, these plant growth modifying or stimulating compositions are applied to plant structures which are capable of growth, i. e., plant structures containing living cells and such plant structures containing dormant cells as tubers and seeds. In the application of these growth regulants to tubers and seeds, it is not known whether the action of the material is to modify the tuber or seed or to alter the growth characteristics of the plant which results from the tuber or seed. For the purposes of this invention, it is intended that the use of the term "plant" includes the living as well as dormant plants.

The following examples illustrate the ability of this new class of growth regulants to stimulate the growth of structures of various plants and also illustrate useful compositions in which these growth regulants may be employed.

Example I

Forty terminal cuttings of yew (Taxus) about four inches long were immersed in an aqueous solution containing 0.125 gram of beta-(diethyl dithiocarbamyl) propionic acid per liter. The excess solution was allowed to drain off, and the treated cuttings were stuck in sterilized wet sand. A like number of yew terminal cuttings were immersed in an aqueous solution containing 0.25 gram of indolebutyric acid per liter and subjected to the same bench rooting trials as those treated with the propionic acid derivative. After 60 days all of the yew cuttings treated with beta-(diethyldithiooocarbamyl) propionic acid had rooted and most of the cuttings were uniformly callused, while the cuttings treated with indolebutyric acid, showed no signs of rooting and only about 10% of the cuttings had callused.

Example II

Forty terminal cuttings of pachysandra two inches long were immersed in an aqueous solution containing 0.2 gram of beta-(isopropyl xanthogen-thio) propionic acid per liter and 0.25 gram of sodium lauryl sulfate as a wetting agent employed to insure thorough wetting of the cuttings with the solution of the growth stimulant. Thirty-three cuttings were immersed in an aqueous solution containing 1.0 gram of indolebutyric acid and 0.25 gram of sodium lauryl sulfate. After 25 days 20 of the cuttings treated with the beta-(xanthogenyl-thio) propionic acid rooted and had numerous primordia. All these cuttings were well callused. Only 10 of the cuttings treated with indolebutyric acid rooted and about the same number callused.

Example III

Terminal chrysanthemum (var. Mary L. Hall) cuttings about three inches long were immersed for 30 seconds in an aqueous solution containing 0.125 gram of beta-(diethyldithiocarbamyl) propionic acid. After the excess solution had drained off, the treated portion of the cuttings were immersed in wet sterilized sand. After 11 days the cuttings were removed and inspected for rooting and callusing. It was found that 70% of the cuttings had rooted and about 95% had uniformly callused. When chrysanthemum cuttings are merely in water and stuck in wet sterilized sand, in four to six weeks only 50% root.

Example IV

Snapdragon cuttings (varieties Lady Dorothy and Margaret) three to four inches long were treated with an aqueous solution containing 0.25 gram of beta-(diethyldithiocarbamyl) propionic acid and 0.25 gram of sodium lauryl sulfate per liter. The treated portions of the cuttings were stuck in wet sterilized sand. After 20 days about 60% of the cuttings had rooted and all cuttings were uniformly callused.

Example V

Tomato (var. Marglobe) petioles with leaves were treated with an aqueous solution containing 0.125 gram of beta-(diethyldithiocarbamyl) propionic acid and 0.25 gram of sodium lauryl sulfate per liter. The treated cuttings were stuck in wet sterilized sand. After 20 days in these bench rooting trials all of the cuttings had rooted heavily and had good primordia along the stem.

When such derivatives of the above beta-(thiono-thio) propionic acids as the ammonium salts, the sodium salts, the zinc salts, the amides, such substituted amides as the diethyl amide, and such esters as the methyl and allyl esters are employed as growth stimulants in the same manner as described in the above examples, the results obtained are similar. In general, the acids and their derivatives produce good uniform callusing on terminal cuttings of most all plants and terminal cuttings of such trees as apple when employed in concentrations of from 0.1 to about 0.3 gram per liter. Usually dusts containing these materials require higher concentrations to produce the desired results because the contact between the growth stimulant and the plant structure is poor.

These growth stimulants have numerous other uses. For example, when seeds and tubers are treated with aqueous solutions and dispersions of the beta-(thiono-thio) propionic acids employed above and such materials as beta-(methyl-thiono-thio) propionic acid, beta-(allyl xanthogenyl-thio) propionic acid, beta-(di-cyclohexyldithiocarbamyl) propionic acid, beta-(piperidyl dithiocarbamyl) propionic acid, beta-(diethyldithiocarbamyl) propionamide, ethyl beta-(isopropyl xanthogenyl-thio) propionate and the like in concentrations varying from as low as 0.1 gram per liter to about 1.0 gram per liter the root system of the resulting plants are much more prolific than those resulting from untreated seeds and tubers. Another example of the utility of these growth regulants is illustrated by the ability of these materials to stimulate root growth of plants after transplanting. For plants whose roots have been treated with aqueous solutions or dispersions of these growth regulants or have been treated with dusts prepared by incorporating the evocator with diatomaceous earths, talc, ordinary soil, and the like and then planted in the usual manner, produce a more prolific root system in less time than untreated transplants. Consequently the treated transplants are not set back in their growth to the same degree that untreated transplants are.

The use of these growth stimulants in concentrations above about 20 grams per liter or in excess of about 2% by weight, in general, sometimes produces injury to the plant structure. Accordingly, when the beta-(thiono-thio) propionic acids and their derivatives are applied to plants by means of compositions containing these growth regulants in concentrations of 5% or more by weight, in many instances the injury may be so severe as to cause the death of the plants so treated which of course, is desirable in some instances as in weed killing. Just how these materials cause the ultimate death of the plants is not completely understood, but it is believed that the presence of the greater amount of the growth regulants alters the metabolic processes of the plant so that the dominance of either anabolic or katabolic processes may lead to the death of the plant.

Although the major portion of the description of the utility of these beta-(dithiocarbonyl) propionic acids and their derivatives has been directed to the altering of the growth characteristics of portions of the plant structure in such a manner as to promote the propagation of plants, it is not intended that the invention shall be so limited, for, as stated above, the materials may be employed to alter the physiology of the plant in such a manner as to kill the plants. In both cases the application of these growth regulants alters the growth characteristics of plants. Accordingly, the effect that these materials have on plants will be referred to in the appended claims as altering the growth characteristics of plants.

In the above examples, the concentration of the active ingredients in the compositions which were employed as growth stimulants was in the range of about 0.01% to about 0.2% by weight. Although these concentrations are considered the optimum concentrations for the purposes for which they were used, the concentration of the active ingredient can be varied from about 0.01 to about 1% for growth stimulation without any deleterious effects. Thus, these growth stimulants have a wide range of tolerance in their application and can be safely employed without any special technical skill.

The effectiveness of the compounds of this invention will vary according to their individual characteristics according to the type of plant structure treated and according to the purpose of the treatment. For example, a different concentration may be required for one variety of plants than required for another, and the concentration required for root initiation may be different from that required for root stimulation. Also the concentration required for antidrop treatment of fruit, while in general is similar, may not be the same as that required to produce parthenogenesis. A further example of the varied activity of these compounds is illustrated by the effective concentration to cause the death of plants, for, in general, while concentrations of 2 to 5% of these beta-(thiono-thio) propionic acids and their derivatives are required to cause the ultimate death of plants, compositions containing only 0.5% by weight of beta-(isopropyl xanthogenyl-thio) propionic acid will in 5 to 10 days cause the ultimate death of such plants as plantain, Spanish needles, wild carrot, and burdock, will cause severe injury to crab grass, but will not injure blue grass. Those skilled in the art having these factors in mind and noting the results of the above examples will be able to determine conditions most suitable in any given case. In any instance the concentration required to achieve the desired results will fall within the range of concentrations given above.

To those skilled in the art of the propagation of plants and especially those versed in the art of employing evocators of plant histogenesis and morphogenesis, many widely differing embodiments of the invention may become apparent. Accordingly, although I have disclosed specific examples of the utility of specific members of this new class of growth regulants, I do not thereby desire or intend to limit myself solely thereto, for as hitherto stated the vehicle and the amount of regulant employed may be varied and other materials of the class having equivalent physiological properties may be employed if desired without departing from the spirit and scope of the invention as defined in the appended claims.

I claim:

1. In the art of altering the growth characteristics of plants by a method which comprises bringing at least a portion of the plant structure into contact with a plant growth regulant and then maintaining the plant structure under conditions normally favoring growth, the improvement which consists in utilizing as the plant growth regulant a composition containing as the essential active ingredient 0.01% to 5% by weight of a compound having the formula

where A is the residue derived from a dithio acid by the removal of the hydrogen atom of the SH group of said acid and where Y is a substituent selected from the class consisting of the hydroxyl radical, an oxy-hydrocarbon radical, the amido radical, a hydrocarbon substituted amido radical, and oxyammonium and oxymetallic groups, intimately admixed with an inert diluent.

2. The method of altering the growth characteristics of plants which comprises wetting at least a portion of the plant structure with an aqueous composition containing a wetting agent and 0.01% to 5% by weight of a beta-(thiono-thio) propionic acid.

3. The method of altering the growth characteristics of plants which comprises wetting at least a portion of the plant structure with an aqueous composition containing a wetting agent and 0.01% to 5% by weight of a beta-(dithiocarbamyl) propionic acid.

4. The method of altering the growth characteristics of plants which comprises wetting at least a portion of the plant structure with an aqueous composition containing a wetting agent and 0.01% to 5% by weight of a beta-(hydrocarbon xanthogenyl-thio) propionic acid.

5. The method of altering the growth characteristics of plants which comprises wetting at least a portion of the plant structure with an aqueous composition containing a wetting agent and 0.01% to 5% by weight of beta-(diethyldithiocarbamyl) propionic acid.

6. The method of altering the growth characteristics of plants which comprises wetting at least a portion of the plant structure with an aqueous composition containing a wetting agent and 0.01% to 5% by weight of beta-(isopropyl xanthogenyl-thio) propionic acid.

7. The method of initiating root growth on plant cuttings which comprises wetting at least a portion of the cutting with an aqueous composition containing a wetting agent and 0.01% to 0.2% by weight of beta-(diethyldithiocarbamyl) propionic acid and maintaining the cutting so treated under conditions favoring root growth.

8. The method of initiating root growth on plant cuttings which comprises wetting at least a portion of the cutting with an aqueous composition containing a wetting agent and 0.01% to 0.2% by weight of beta-(isopropyl xanthogenyl-thio) propionic acid and maintaining the cutting so treated under conditions favoring root growth.

9. A composition for altering the growth characteristics of plants containing water, a wetting agent and as an essential active ingredient 0.01% to 5% by weight of a beta-(hydrocarbon xanthogenyl-thio) propionic acid.

10. A composition for altering the growth characteristics of plants containing water, a wetting agent and as an essential active ingredient 0.01% to 5% by weight of beta-(isopropyl xanthogenyl-thio) propionic acid.

WILLIAM D. STEWART.

REFERENCES CITED

The following references are of record in the file of this patent:

UNITED STATES PATENTS

| Number | Name | Date |
|---|---|---|
| 1,962,109 | Alvord | June 5, 1934 |
| 2,187,719 | Williams | Jan. 23, 1940 |
| 2,325,720 | Urbschat et al. | Aug. 3, 1943 |
| 2,326,471 | Lontz | Aug. 10, 1943 |
| 2,416,198 | Moyer | Feb. 18, 1947 |
| 2,474,839 | Gresham et al. | July 5, 1949 |

OTHER REFERENCES

Roark et al.:-"A List of Organic Sulfur Compounds," U. S. Department of Agriculture Bulletin, May 1935, page 78.